US008345206B2

(12) United States Patent
Hasegawa et al.

(10) Patent No.: US 8,345,206 B2
(45) Date of Patent: Jan. 1, 2013

(54) LIQUID CRYSTAL DISPLAY (75) Inventors: Rei Hasegawa, Yokohama (JP); Yuko Kizu, Yokohama (JP); Hajime Yamaguchi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 535 days.

(21) Appl. No.: 12/565,208

(22) Filed: Sep. 23, 2009

(65) Prior Publication Data

US 2010/0079700 A1   Apr. 1, 2010

(30) Foreign Application Priority Data

Sep. 26, 2008   (JP) ................. 2008-248323

(51) Int. Cl.
*G02F 1/1343* (2006.01)
*G02F 1/1335* (2006.01)
*G02F 1/07* (2006.01)

(52) U.S. Cl. .......... 349/141; 349/98; 349/175; 349/176; 359/258

(58) Field of Classification Search ............... 349/98, 349/141, 175, 176
See application file for complete search history.

(56) References Cited

U.S. PATENT DOCUMENTS

| 5,796,454 | A  | * | 8/1998 | Ma ............................ 349/98 |
| 2005/0185131 | A1 | * | 8/2005 | Miyachi et al. ............... 349/167 |
| 2008/0100764 | A1 | * | 5/2008 | Haruyama ..................... 349/43 |

FOREIGN PATENT DOCUMENTS

| JP | 2005-202383 | 7/2005 |
| JP | 2005-202390 | 7/2005 |
| JP | 2006-215287 | 8/2006 |
| JP | 2006-243036 | 9/2006 |
| JP | 2008-112021 | 5/2008 |
| JP | 2008-112022 | 5/2008 |
| JP | 2009-104061 | 5/2009 |
| WO | WO 2005/080529 | 9/2005 |

OTHER PUBLICATIONS

Office Action mailed Sep. 25, 2012, in Japanese Patent Application No. 2008-248323, filed Sep. 26, 2008 (with English-language Translation), 6 pages.

* cited by examiner

*Primary Examiner* — Michael Caley
(74) *Attorney, Agent, or Firm* — Oblon, Spivak, McClelland, Maier & Neustadt, L.L.P.

(57) ABSTRACT

A liquid crystal display includes a liquid crystal layer causing a selective reflection and exhibiting Kerr effect, first and second electrodes applying voltage to the liquid crystal layer, a first circular polarizer disposed between the liquid crystal layer and a viewer and allowing a first circularly polarized light incident on the liquid crystal layer when irradiated with a natural light, the first circularly polarized light having an electric-field vector rotating in a direction reverse to a rotation direction of an electric-field vector of a circularly polarized light selectively reflected by the liquid crystal layer, and a second circular polarizer facing the first circular polarizer with the liquid crystal layer interposed therebetween and allowing a second circularly polarized light incident on the liquid crystal layer when irradiated with a natural light.

20 Claims, 10 Drawing Sheets

LIQUID CRYSTAL DISPLAY

CROSS-REFERENCE TO RELATED APPLICATIONS

This application is based upon and claims the benefit of priority from prior Japanese Patent Application No. 2008-248323, filed Sep. 26, 2008, the entire contents of which are incorporated herein by reference.

BACKGROUND OF THE INVENTION

1. Field of the Invention

The present invention relates to a liquid crystal display technique.

2. Description of the Related Art

A liquid crystal display employing a particular display mode such as in-plane switching (IPS) mode, vertically aligned (VA) mode and optically compensated bend (OCB) mode can achieve high response speed. Even such a liquid crystal display, however, still has not achieved a response speed comparable to that of a cathode-ray tube (CRT) display.

JP-A 2005-202390 (KOKAI) and JP-A 2008-112021 (KOKAI) describe a liquid crystal display utilizing Kerr effect. Kerr effect is the effect of a transparent isotropic medium to exhibit an anisotropic refractive index at a magnitude in proportion to the square of an external electric field. A liquid crystal material exhibiting Kerr effect achieves a fast electric field-response of several milliseconds or less because a correlation length of liquid crystal molecules is short.

As a liquid crystal phase exhibiting Kerr effect, the so-called blue phase is known. The blue phase is, for example, a phase that appears within a temperature range between those for the cholesteric phase (chiral nematic phase) and the isotropic phase.

As the liquid crystal material exhibiting the blue phase, a liquid crystal phase capable of exhibiting the cholesteric phase is used. For this reason, similar to a liquid crystal material exhibiting the cholesteric phase, a liquid crystal material exhibiting the blue phase is seen colored due to a selective reflection. Since this color is typically blue, in the case where a liquid crystal display is so designed that the liquid crystal material exhibits the blue phase when displaying a black image, it is possible that the black image is seen bluish. In addition, this coloring hinders achieving a high contrast ratio and a wide viewing angle. In particular, the influence of the coloring becomes significant when the display is used under strong light of the outdoor environment or when the brightness of the backlight for illuminating the display is lowered.

In this regard, JP-A 2005-202390 (KOKAI) describes that the chiral agent content of the liquid crystal material is increased to make the selective reflection wavelength shift from the visible region to the ultraviolet region. When the selective reflection wavelength is within the ultraviolet region, the coloring due to the selective reflection cannot occur. Therefore, it is possible to prevent the above-described problems from occurring.

BRIEF SUMMARY OF THE INVENTION

According to a first aspect of the present invention, there is provided a liquid crystal display comprising a liquid crystal layer causing a selective reflection and exhibiting Kerr effect, first and second electrodes applying voltage to the liquid crystal layer, a first circular polarizer disposed between the liquid crystal layer and a viewer and allowing a first circularly polarized light incident on the liquid crystal layer when irradiated with a natural light, the first circularly polarized light having an electric-field vector rotating in a direction reverse to a rotation direction of an electric-field vector of a circularly polarized light selectively reflected by the liquid crystal layer, and a second circular polarizer facing the first circular polarizer with the liquid crystal layer interposed therebetween and allowing a second circularly polarized light incident on the liquid crystal layer when irradiated with a natural light.

According to a second aspect of the present invention, there is provided a liquid crystal display comprising a liquid crystal layer causing a selective reflection and exhibiting Kerr effect, first and second electrodes applying voltage to the liquid crystal layer, a first circular polarizer facing the liquid crystal layer and allowing a first circularly polarized light incident on the liquid crystal layer when irradiated with a natural light, the first circularly polarized light having an electric-field vector rotating in a direction reverse to a rotation direction of an electric-field vector of a circularly polarized light selectively reflected by the liquid crystal layer, a second circular polarizer facing the first circular polarizer with the liquid crystal layer interposed therebetween and allowing a second circularly polarized light incident on the liquid crystal layer when irradiated with a natural light, and a backlight illuminating the liquid crystal layer through the second circular polarizer.

According to a third aspect of the present invention, there is provided a liquid crystal display comprising a liquid crystal layer causing a selective reflection, a first electrode including comb-tooth portions each extending in a first direction parallel with a main surface of the liquid crystal layer and arranged in a second direction parallel with the main surface and crossing the first direction, a second electrode facing the main surface at an opening between the comb-tooth portions or through the opening, a first circular polarizer facing the liquid crystal layer and allowing a first circularly polarized light incident on the liquid crystal layer when irradiated with a natural light, the first circularly polarized light having an electric-field vector rotating in a direction reverse to a rotation direction of an electric-field vector of a circularly polarized light selectively reflected by the liquid crystal layer, a second circular polarizer facing the first circular polarizer with the liquid crystal layer interposed therebetween and allowing a second circularly polarized light incident on the liquid crystal layer when irradiated with a natural light, and a backlight illuminating the liquid crystal layer through the second circular polarizer.

DETAILED DESCRIPTION OF THE INVENTION

Embodiments of the present invention will be described below with reference to the accompanying drawings. Note that the same reference numerals in the drawings denote components that achieve the same or similar functions, and a repetitive explanation thereof will be omitted.

Figure 1:
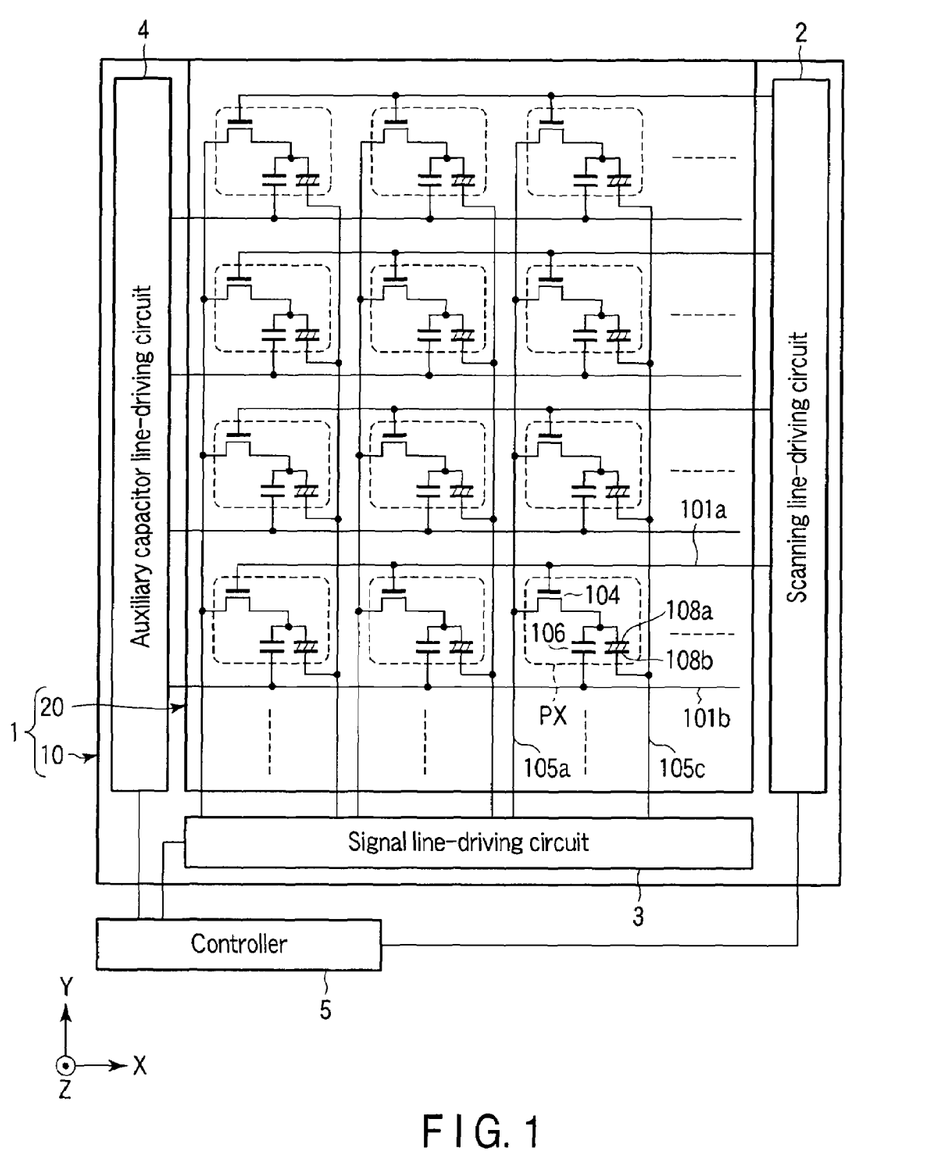
FIG. 1 is a plan view schematically showing a liquid crystal display according to an embodiment of the present invention.
Figure 2:
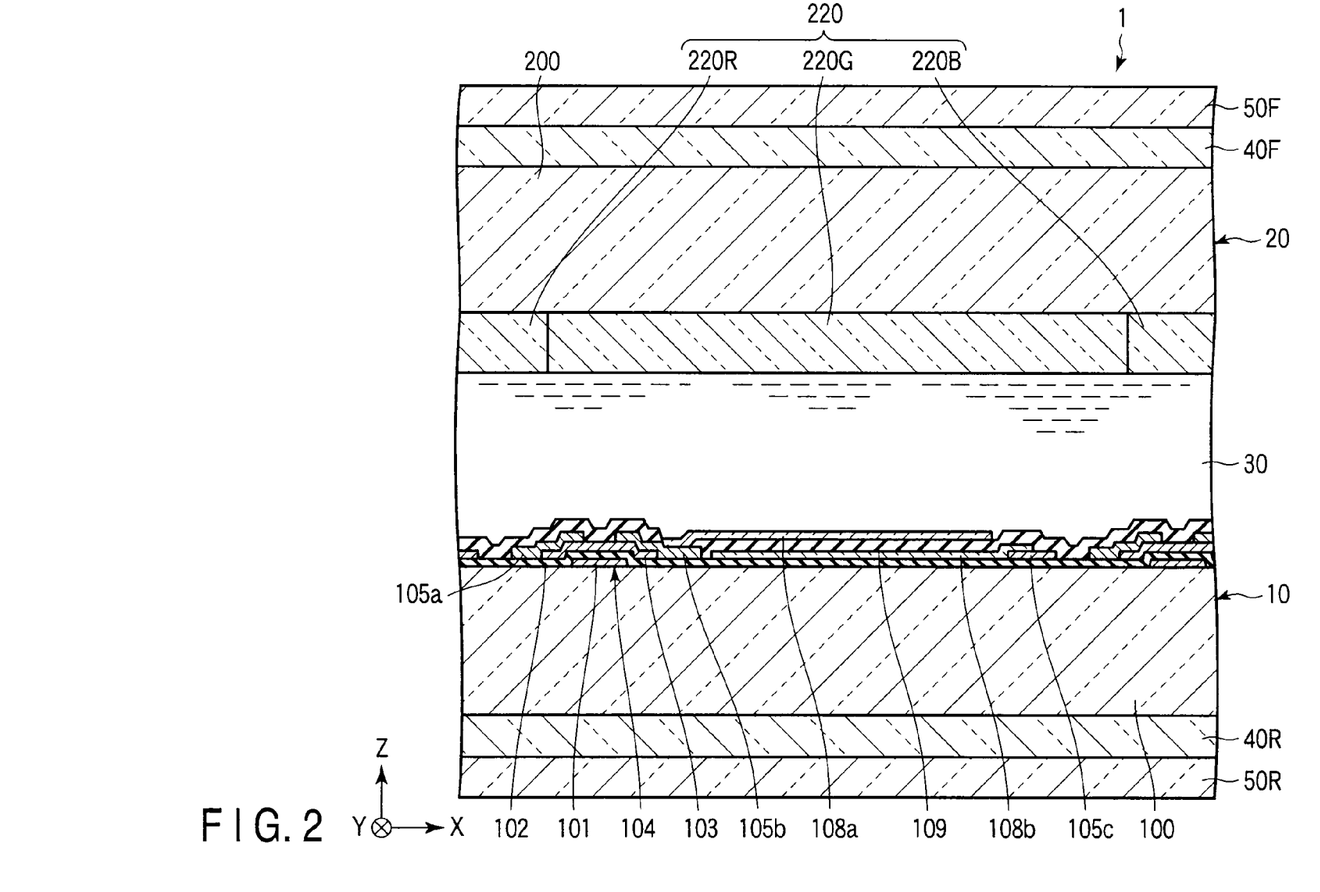
FIG. 2 is a cross-sectional view schematically showing an example of a structure that can be employed in the display panel of the liquid crystal display shown in FIG. 1.
Figure 3:
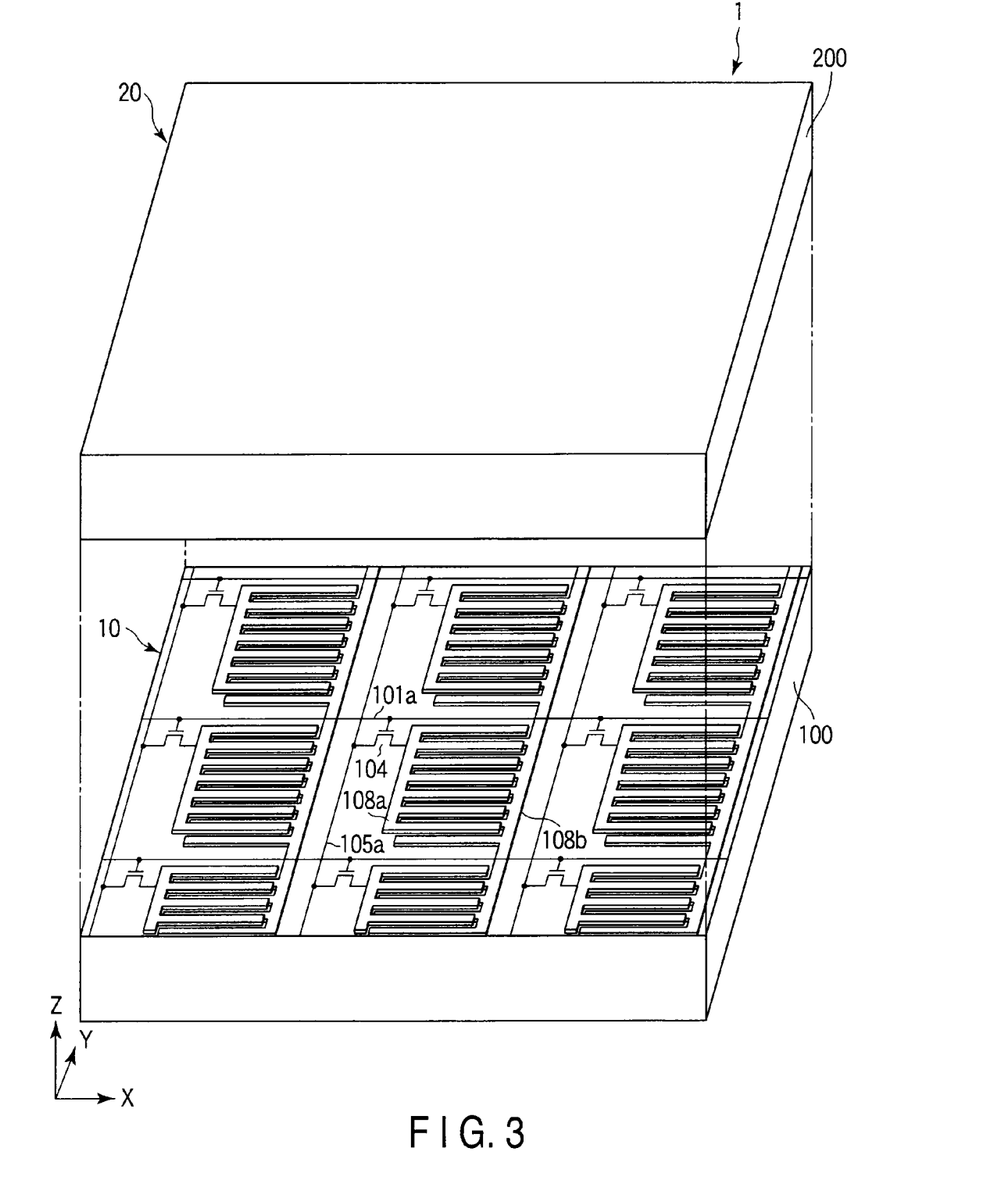
FIG. 3 is an exploded perspective view of the liquid crystal display panel shown in FIG. 2.

FIG. 1 is a plan view schematically showing a liquid crystal display according to an embodiment of the present invention. FIG. 2 is a cross-sectional view schematically showing an example of structures that can be employed in the display panel of the liquid crystal display shown in FIG. 1. FIG. 3 is an exploded perspective view of the liquid crystal display panel shown in FIG. 2. Note that one or more components are omitted in FIG. 3 for the sake of simplification.

The liquid crystal display shown in FIGS. 1 to 3 is an active matrix liquid crystal display. The liquid crystal display includes a liquid crystal display panel 1; a backlight (not shown) placed to face the liquid crystal display panel 1; a scanning line-driving circuit 2, a signal line-driving circuit 3 and an auxiliary capacitor line-driving circuit 4 each connected to the liquid crystal display panel 1; and a controller 5 connected to the driving circuits 2 to 4.

The liquid crystal display panel 1 includes an array substrate 10 and a counter substrate 20. A frame-shaped sealing layer (not shown) is interposed between the array substrate 10 and the counter substrate 20. A space surrounded by the array substrate 10, the counter substrate 20, and the sealing layer is filled with a liquid crystal material. This liquid crystal material forms a liquid crystal layer 30. A quarter-wave plate 40R and a linear polarizer 50R are placed in this order on the outer surface of the array substrate 10. On the outer surface of the counter substrate 20, a quarter-wave plate 40F and a linear polarizer 50F are placed in this order.

The array substrate 10 includes a light-transmitting substrate 100. The substrate 100 is, for example, a glass substrate or a plastic substrate.

On the substrate 100, scanning lines 101a and auxiliary capacitor lines 101b are arranged. The scanning lines 101a and the auxiliary capacitor lines 101b run in the X-direction, and are alternately arranged in the Y-direction crossing the X-direction.

Note that the X-direction and the Y-directions are parallel with a main surface of the substrate 100 and are directions crossing each other. The Z-direction to be described later is the direction perpendicular to the X-direction and the Y-direction.

Each of the scanning lines 101a includes projections that project in the Y-direction. The projections are utilized as the gate electrodes of thin-film transistors to be described later.

Each of the auxiliary capacitor lines 101b includes projections that project in the Y-direction. The projections are utilized as the electrode of capacitors to be described later.

The scanning lines 101a and the auxiliary capacitor lines 101b can be formed simultaneously. As the material of these lines, it is possible to use, e.g., a metal or alloy.

The scanning lines 101a and the auxiliary capacitor lines 101b are covered with an insulating film 102. As the insulating film 102, a silicon oxide film can be used, for example.

On the insulating film 102, semiconductor layers 103 are arranged correspondently with the gate electrodes described above. The semiconductor layers 103 intersect the gate electrodes. The semiconductor layers 103 are made of, e.g., amorphous silicon.

The gate electrodes, the semiconductor layers 103, and those portions of the insulating film 102 that are positioned between the gate electrodes and the semiconductor layers 103, i.e., gate insulators, form thin-film transistors. These thin-film transistors are utilized as switches 104.

Note that in this embodiment, the switches 104 are n-channel thin-film transistors. Note also that a channel protection layer and an ohmic layer (neither is shown) are formed on each semiconductor layer 103.

The switches 104 may be p-channel thin-film transistors. Alternatively, the switches 104 may be other switching elements such as diodes.

On the insulating film 102, signal lines 105a, source electrodes 105b and power supply lines 105c are further arranged.

The signal lines 105a run in the Y-direction, and are arranged in the X-direction correspondently with the columns that the switches 104 form. The signal lines 105a cover the drains of the semiconductor layers 103 included in the switches 104. That is, portions of each signal line 105a are drain electrodes connected to the switches 104.

The source electrodes 105b are arranged correspondently with the switches 104. The source electrodes 105b cover the sources of the switches 104, and face portions of the auxiliary capacitor lines 101b. The source electrodes 105b, the auxiliary capacitor lines 101b, and the insulating film 102 interposed between them form capacitors 106.

The power supply lines 105c extend in the Y-direction and are arranged in the X-direction. It is possible that the power supply lines 105c extend in the X-direction and are arranged in the Y-direction.

On the insulating film 102, counter electrodes 108b are further arranged correspondently with the switches 104. Each of the counter electrodes 108b covers the power supply line 105c at least partially and includes a comb-shaped portion having comb-teeth whose longitudinal directions are parallel with the X-direction. As the material of the counter electrodes 108b, indium thin oxide (ITO) can be used, for example. Note that in the case where the adjacent counter electrodes 108b arranged in the Y-direction are connected to each other, the power supply lines 105c can be omitted.

The counter electrodes 108b are covered with an insulating film 109. The insulating film 109 is, for example, a transparent inorganic layer such as a silicon oxide film and a silicon nitride film. As the insulating film 109, a transparent organic layer may be used.

On the insulating film 109, pixel electrodes 108a are arranged correspondently with the counter electrodes 108b. The pixel electrodes 108a are insulated from the counter electrodes 108b and each covers the source electrode 105b at least partially. As the material of the pixel electrodes, ITO can be used, for example.

The pixel electrodes 108a face portions of a main surface of the substrate 100, while the counter electrodes 108b face other portions of the main surface of the substrate 100 at least partially. Here, each pixel electrode 108a has a comb-shape and the comb teeth portions thereof face regions between the comb teeth portions of the counter electrode 108b.

Note that the switch 104, the capacitor 106, the pixel electrode 108a and the counter electrode 108b form a pixel circuit. It is possible that the pixel circuit does not include the capacitor 106.

The counter substrate 20 includes a light-transmitting substrate 200. The substrate 200 is, for example, a glass substrate or a plastic substrate.

On the substrate 200, a black matrix (not shown) and a color filter layer 220 are formed in this order.

The black matrix is a light-shielding layer provided with openings at positions facing the pixel electrodes 108a and the counter electrodes. For example, the black matrix is a patterned layer having a grid shape or a stripe shape. As the material of the black matrix, metal such as chromium or alloy can be used, for example.

The color filter layer 220 includes a red coloring layer 220R, a green coloring layer 220G and a blue coloring layer 220B. The coloring layers 220R, 220G and 220B form a stripe arrangement correspondently with the columns of the pixel circuits. The coloring layers 220R, 220G and 220B may form other arrangement such as delta arrangement or rectangular arrangement.

The array substrate 10 and the counter substrate 20 are placed such that the pixel circuits and the color filter 220 face each other. A frame-shaped sealing layer (not shown) is interposed between the array substrate 10 and the counter substrate 20. The sealing layer bonds the array substrate 10 to the counter substrate 20. An adhesive can be used as the material of the sealing layer.

Granular spacers are interposed between the array substrate 10 and the counter substrate 20. Alternatively, the array substrate 10 and/or the counter substrate 20 may further include columnar spacers. These spacers form a gap having a substantially constant thickness at positions corresponding to the pixel electrodes 108a between the array substrate 10 and the counter substrate 20.

A space surrounded by the array substrate 10, the counter substrate 20, and the sealing layer is filled with a liquid crystal material. The liquid crystal material forms the liquid crystal layer. The liquid crystal material exhibits blue phase. That is, the liquid crystal layer 30 causes a selective reflection and exhibits Kerr effect.

Typically, the liquid crystal material is a mixture including a liquid crystal compound and a chiral agent. The mixture may further include other substances. For example, in the case where another liquid crystal compound, to be more specific, a polymer having a molecular weight much higher than that of a low-molecular weight compound is added to the mixture, it is possible to widen the temperature range within which the blue phase appears.

Here, as an example, it is supposed that the liquid crystal material is a mixture of a nematic liquid crystal material having a positive dielectric anisotropy and a chiral agent. Further, it is supposed that liquid crystal layer 30 selectively reflects a left-handed circularly-polarized light having a specific wavelength $\lambda_{SR}$ in the zero-voltage state, that is, in the state where a black image is displayed. In addition, here, for the sake of simplification, it is supposed that the liquid crystal layer 30 serves as a half-wave plate for all the wavelengths within the visible region when displaying a white image.

The selective reflection wavelength $\lambda_{SR}$ is, for example, longer than 400 nm and shorter than 800 nm. In order to set the selective reflection wavelength $\lambda_{SR}$ shorter than 400 nm, it is necessary to set the concentration of the chiral agent, for example, at 10% by mass or more. When a large amount of chiral agent is added, it is possible that the chiral agent precipitates out when used at low temperature or used for a long period time. In addition, since the chiral agent has a dielectric anisotropy smaller than that of the nematic liquid crystal material, adding a large amount of chiral agent raises the drive voltage. On the other hand, when the selective reflection wavelength $\lambda_{SR}$ is increased, for example, to 800 nm or longer, the stability of the twist structure is lowered, thus the temperature range within which the blue phase appears is narrowed.

The pitch of the twist structure that the arrangement of the liquid crystal molecules forms is, for example, longer than 253 nm and equal to or shorter than 600 nm. Since the refractive index of a liquid crystal material that exhibits the blue phase is about 1.5, when such a design is employed, the selective reflection wavelength $\lambda_{SR}$ can be set longer than 400 nm and shorter than 800 nm.

The Kerr constant of the liquid crystal material falls, for example, within a range of $1\times10^{-11}$ mV$^{-2}$ to $1\times10^{-8}$ mV$^{-2}$. In the case, where the Kerr constant of the liquid crystal material is small, achieving a high contrast ratio is difficult.

The pixel electrodes 108a, the counter electrodes 108b and the liquid crystal layer 30 form liquid crystal elements. Each pixel PX includes the liquid crystal element, the switch 104 and the capacitor 106. The array substrate 10; the counter substrate 20; and the liquid crystal layer and the sealing layer interposed therebetween form a liquid crystal cell.

The quarter-wave plate 40R and the linear polarizer 50R form a circular polarizer. The circular polarizer converts a natural light emitted by the backlight into a right-handed circularly polarized light or a left-handed circularly polarized light so as to allow the circularly polarized light incident on the liquid crystal layer 30. Here, as an example, it is supposed that the circular polarizer is a left-handed circular polarizer, the transmission axis of the linear polarizer 50R forms an angle of 45° with the Y-direction in a clockwise direction when viewed from the backside of the liquid crystal display panel 1, and the slow axis of the quarter-wave plate 40R is parallel with the X-direction. Note that the term "natural light" means a non-polarized light, that is, a light having no anisotropy.

The quarter-wave plate 40F and the linear polarizer 50F form a circular polarizer. The circular polarizer converts an extraneous light as a natural light such as sunlight and interior illuminating light into a circularly polarized light having an electric field vector rotating in a reverse direction with respect to that of the circularly polarized light emitted by the circular polarizer including the quarter-wave plate 40R and the linear polarizer 50R, and allows the circularly polarized light incident on the liquid crystal layer 30. Here, as an example, it is supposed that the circular polarizer is a right-handed circular polarizer, the transmission axis of the linear polarizer 50F is perpendicular to the transmission axis of the linear polarizer 50R, and the slow axis of the quarter-wave plate 40F is parallel with the Y-direction.

In general, a circular polarizer converts a natural light into a circularly polarized light only for one or some of wavelengths within the visible region, and converts a natural light into an elliptically polarized light for other wavelengths within the visible region. The circular polarizer including the quarter-wave plate 40R and the linear polarizer 50R and the circular polarizer including the quarter-wave plate 40F and the linear polarizer 50F are so design that a natural light having the selective reflection wavelength $\lambda_{SR}$ is converted into a circularly polarized light or an elliptically polarized light having a small axial ratio. Here, for the sake of simplification, it is supposed that each circular polarizer converts a natural light into a circularly polarized light for all the wavelengths within the visible range.

To the scanning line-driving circuit 2, the scanning lines 101a are connected. The scanning line-driving circuit 2 sequentially supplies a first scanning voltage that makes the switches 104 closed to the scanning lines 101a. The scanning line-driving circuit 2 further supplies a second scanning voltage that makes the switches 104a open to the scanning lines 101a to which the first scanning voltage is not supplied.

To the signal line-driving circuit 3, the signal lines 105a and the power supply lines 105c are connected. The signal line-driving circuit 3 supplies signal voltages to the signal lines 105a at magnitudes corresponding to video signals. The signal line-driving circuit 3 further supplies a display voltage, which is typically a constant voltage, to the power supply lines 105c. Although employed is a structure in which the signal line-driving circuit 3 includes the voltage source for supplying the display voltage to the power supply lines 105c, the voltage source for supplying the display voltage to the power supply lines 105c may be separated from the signal line-driving circuit 3.

To the auxiliary capacitor line-driving circuit 4, the auxiliary capacitor lines 101b are connected. When the signal line-driving circuit 3 reverses the polarity of the video signals to be output to the signal lines 105a from positive to negative, the auxiliary capacitor line-driving circuit 4 changes the potential of the auxiliary capacitor line 101b connected to the pixels, to which the signal voltages are to be supplied, from a first potential to a second potential in synchronization with the polarity reversal. When the signal line-driving circuit 3 reverses the polarity of the video signals to be output to the signal lines 105a from negative to positive, the auxiliary capacitor line-driving circuit 4 changes the potential of the auxiliary capacitor line 101b connected to the pixels, to which the signal voltages are to be supplied, from the second potential to the first potential in synchronization with the polarity reversal. Note that "a polarity of a signal voltage" means the polarity of the difference between the signal voltage and the display voltage.

The driving circuits 2 to 4 may be mounted by chip-on-glass (COG). Alternatively, the driving circuits 2 to 4 may be mounted by tape carrier package (TCP).

The controller 5 is connected to the driving circuits 2 to 4. The controller 5 controls the operations of the driving circuits 2 to 4.

As described above, increasing the chiral agent content of the liquid crystal material can shift the selective reflection wavelength shifts from the visible region to the ultraviolet region. When the selective reflection wavelength falls within the ultraviolet region, the coloring due to the selective reflection cannot occur.

When the chiral agent content of the liquid crystal material is increased, however, the reliability is decreased due to the precipitation of the chiral agent and the service temperature range is narrowed. In addition, since the dielectric anisotropy of the chiral agent is small, increasing its content makes a higher drive voltage necessary.

The liquid crystal display described with reference to FIGS. 1 to 3 is less prone to cause a coloring due to the selective reflection even in the case where the chiral agent content of the liquid crystal is small. This will be described below.

Figure 4:
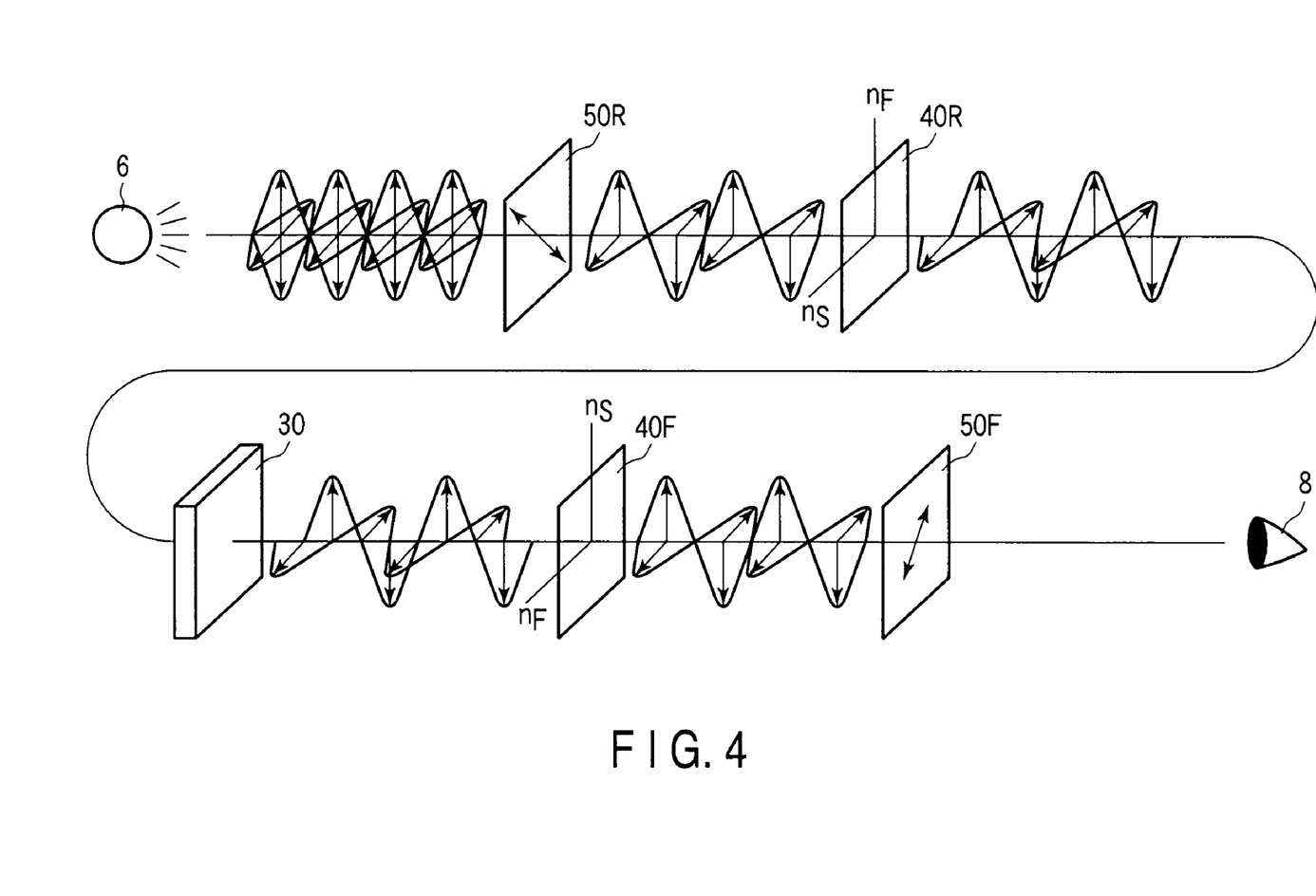
FIG. 4 is a view schematically showing a state of the liquid crystal display shown in FIG. 1 when displaying a black image.
Figure 5:
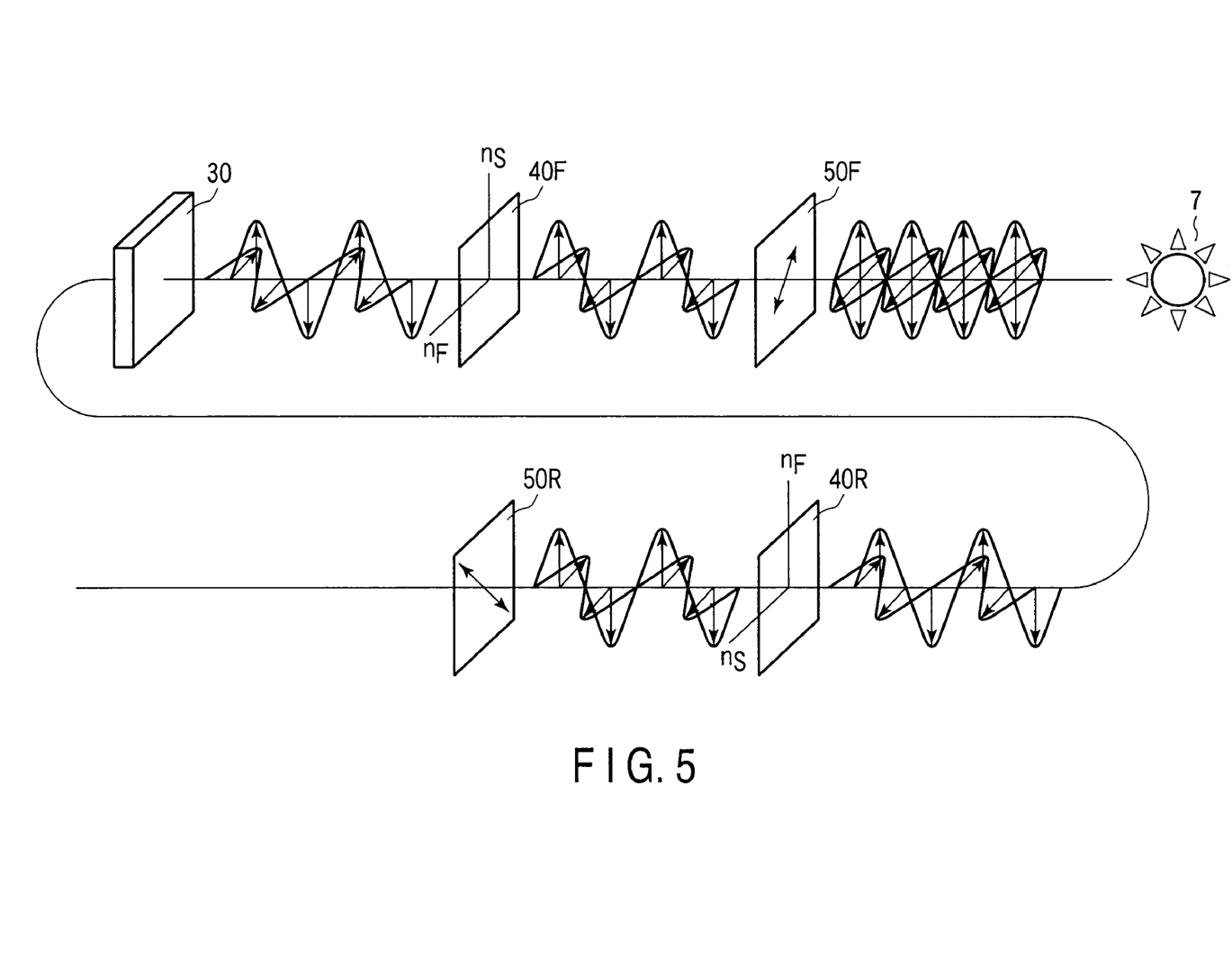
FIG. 5 is a view schematically showing a state of the liquid crystal display shown in FIG. 1 when displaying a black image while illuminating its front surface with a natural light.
Figure 6:
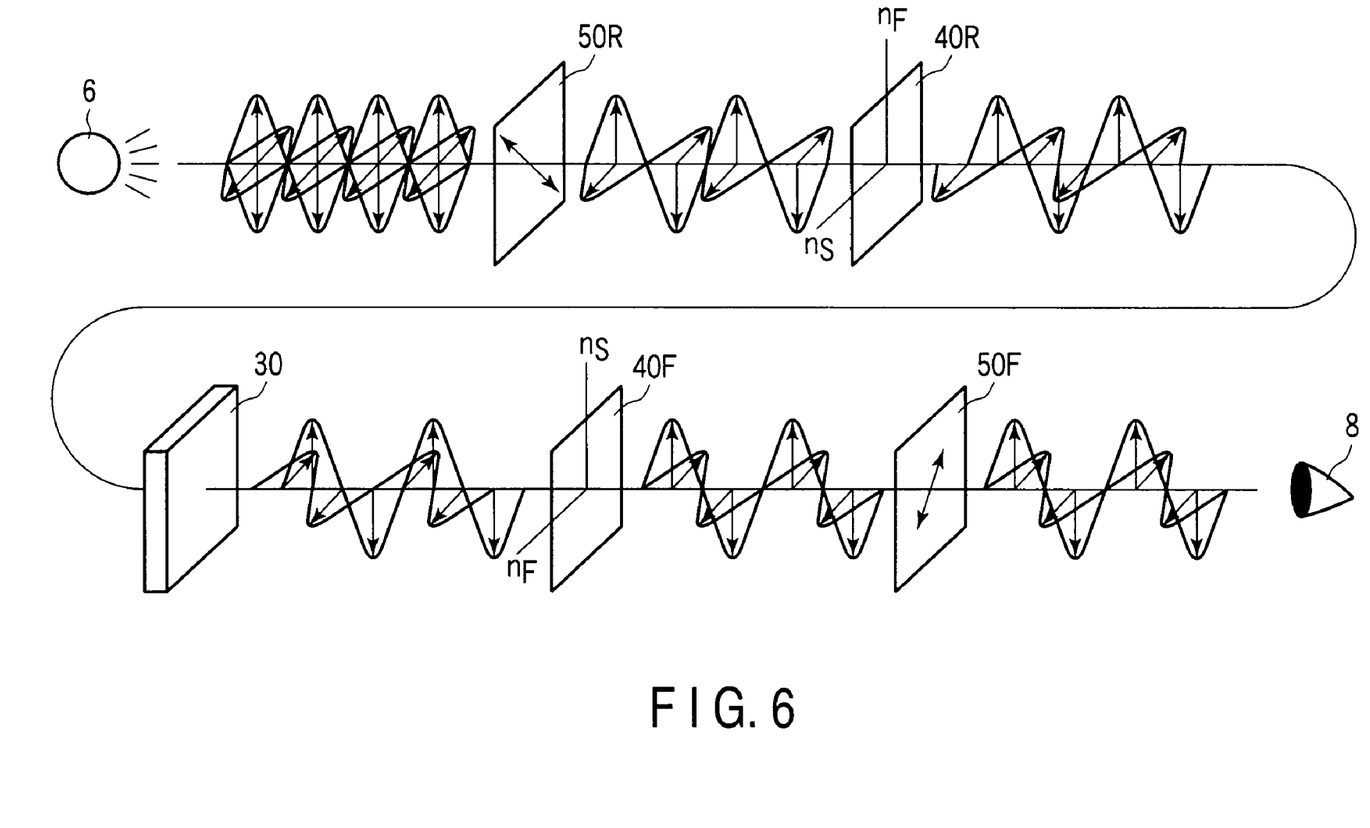
FIG. 6 is a view schematically showing a state of the liquid crystal display shown in FIG. 1 when displaying a white image.

FIG. 4 is a view schematically showing a state of the liquid crystal display shown in FIG. 1 when displaying a black image. FIG. 5 is a view schematically showing a state of the liquid crystal display shown in FIG. 1 when displaying a black image while illuminating its front surface with a natural light. FIG. 6 is a view schematically showing a state of the liquid crystal display shown in FIG. 1 when displaying a white image.

When displaying a black image, the liquid crystal display panel 1 blocks the light emitted by the backlight 6 as shown in FIG. 4.

A natural light emitted by the backlight 6, typically a white light enters the linear polarizer 50R. The linear polarizer 50R converts the natural light to a linearly polarized light.

The linearly polarized light enters the quarter-wave plate 40R. The quarter-wave plate 40R converts the linearly polarized light to a left-handed circularly polarized light.

The left-handed circularly polarized light enters the liquid crystal layer 30. When displaying a black image, no voltage is applied or a voltage whose absolute value is almost zero is applied between the electrodes 108a and 108b. Therefore, the liquid crystal layer 30 selectively reflects a left-handed circularly polarized light component having the specific wavelength $\lambda_{SR}$ and transmits a left-handed circularly polarized light components of other wavelengths.

The left-handed circularly polarized light component selectively reflected by the liquid crystal layer 30 travels back and forth between the liquid crystal layer 30 and the backlight 6 while repeating the conversion between the linearly polarized light and the left-handed circularly polarized light. This light is attenuated in the course of this process and thus is not utilized for displaying an image.

On the other hand, the left-handed circularly polarized light components that the liquid crystal layer 30 transmits enter the quarter-wave plate 40F. The quarter-wave plate 40F converts the left-handed circularly polarized light to a linearly polarized light.

The linearly polarized light enters the linear polarizer 50F. The electric-field vector of the linearly polarized light has an oscillation plane perpendicular to the transmission axis of the linear polarizer 50F. Therefore, the linearly polarized light is absorbed by the linear polarizer 50F. Thus, the light emitted by the backlight 6 does not reach the viewer 8.

Further, when displaying a black image, the light emitted by the light source 7 is not selectively reflected but absorbed by the liquid crystal display panel 1 as shown in FIG. 5.

It is supposed that the front face of the liquid crystal display displaying a black image is illuminated with a white light as a natural light emitted by the light source 7 such as the sun and luminaire as shown in FIG. 5. The natural light enters the linear polarizer 50F. The linear polarizer 50 converts the natural light to a linearly polarized light.

The linearly polarized light enters the quarter-wave plate 40F. The quarter-wave plate 40F converts the linearly polarized light to a right-handed circularly polarized light.

The right-handed circularly polarized light enters the liquid crystal layer 30. Although the liquid crystal layer 30 selectively reflects the left-handed circularly polarized light having the specific wavelength $\lambda_{SR}$, no right-handed circularly polarized light is selectively reflected by the liquid crystal layer 30. That is, the liquid crystal layer 30 transmits the above-described right-handed circularly polarized light.

The right-handed circularly polarized light enters the quarter-wave plate 40R. The quarter-wave plate 40R converts the right-handed circularly polarized light to a linearly polarized light.

The linearly polarized light enters the linear polarizer 50R. The electric-field vector of the linearly polarized light has an oscillation plane perpendicular to the transmission axis of the linear polarizer 50R. Therefore, the linearly polarized light is absorbed by the linear polarizer 50R.

As described above, when the front face of the liquid crystal display is illuminated with a white light as a natural light, no selective reflection occurs and the incident light is absorbed by the linear polarizers 50F and 50R. Therefore, the liquid crystal display can display a black image of low brightness at high color purity.

When displaying a white image, the liquid display panel 1 transmits portions of light components emitted by the backlight 6 as shown in FIG. 6.

A natural light emitted by the backlight 6, typically a white light enters the linear polarizer 50R. The linear polarizer 50R converts the natural light to a linearly polarized light.

The linearly polarized light enters the quarter-wave plate 40R. The quarter-wave plate 40R converts the linearly polarized light to a left-handed circularly polarized light.

The left-handed circularly polarized light enters the liquid crystal layer 30. When displaying a white image, a voltage whose absolute value is relatively large is applied between the electrodes 108a and 108b. Therefore, the liquid crystal layer 30 does not selectively reflect a left-handed circularly polarized light component having the specific wavelength $\lambda_{SR}$ but serves as a wave plate having a slow axis parallel with the Y-direction. Supposing that the liquid crystal layer 30 serves as a half-wave plate, the liquid crystal layer 30 converts the above-described left-handed circularly polarized light to a right-handed circularly polarized light.

The right-handed circularly polarized light enters the quarter-wave plate 40F. The quarter-wave plate 40F converts the right-handed circularly polarized light to a linearly polarized light.

The linearly polarized light enters the linear polarizer 50F. The electric-field vector of the linearly polarized light has an oscillation plane parallel with the transmission axis of the linear polarizer 50F. Therefore, ideally, the linear polarizer 50R transmits the linearly polarized light without absorbing it.

That is, ideally, all the light components emitted by the backlight 6 and subsequently transmitted by the linear polarizer 50R reach the viewer 8. Therefore, the viewer 8 perceives a white image.

Note that the liquid crystal layer 30 causes no selective reflection when displaying a white image. Therefore, coloring of the white image due to selective reflection cannot occur.

As will be apparent from the above descriptions, the liquid crystal display is less prone to cause the coloring due to selective reflection regardless of the chiral agent content of the liquid crystal material. In other words, according to the above-described technique, suppressing the coloring due to selective reflection is made possible without increasing the chiral agent content of the liquid crystal material.

Various modifications can be made to the liquid crystal display.

Figure 7:
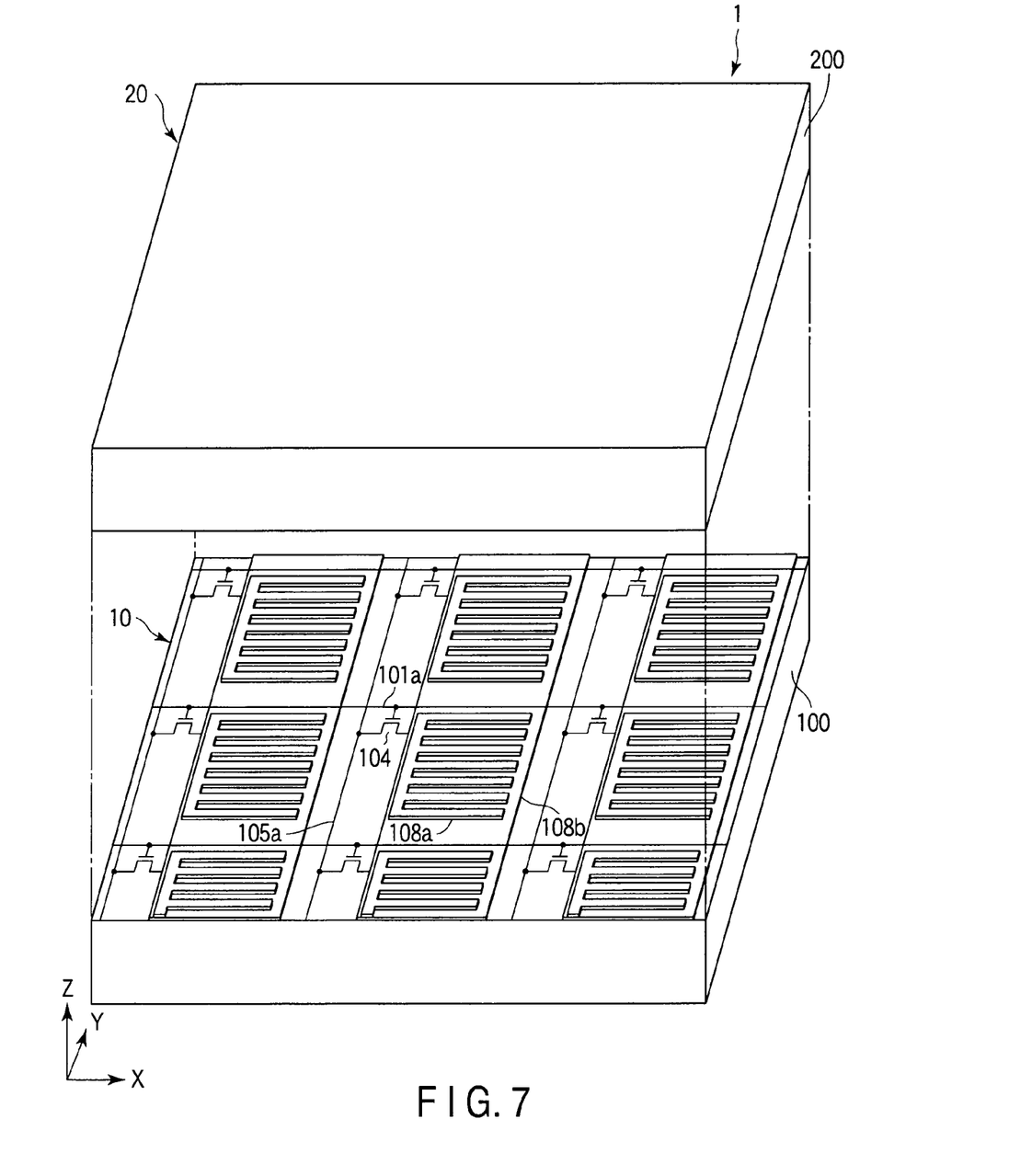
FIG. 7 is an exploded perspective view showing a liquid crystal display panel of a liquid crystal display according to a modified example.

FIG. 7 is an exploded perspective view showing a liquid crystal display panel of a liquid crystal display according to a modified example. Note that one or more components are omitted in FIG. 7 for the sake of simplification.

In the liquid crystal display panel 1 shown in FIG. 7, the counter electrodes 108b do not include the comb tooth portions. Instead, in the liquid crystal display panel 1, the counter electrodes 108b form band-shaped patterns each extending in the Y-direction and arranged in the X-direction. The liquid crystal display panel 1 shown in FIG. 7 is the same as the liquid crystal display panel 1 described with reference to FIGS. 1 to 3 except for the above.

The liquid crystal display panel 1 described with reference to FIGS. 1 to 3 can apply a higher voltage to the liquid crystal layer 30 as compared to the liquid crystal display panel shown in FIG. 7. On the other hand, the counter electrodes 108b of the liquid crystal display panel 1 shown in FIG. 7 can be formed easier than those of the liquid crystal panel 1 described with reference to FIGS. 1 to 3.

Like this, in the liquid crystal display described with reference to FIGS. 1 to 3, the shapes and arrangement of the electrodes can be changed.

The circular polarizer including the quarter-wave plate 40F and the linear polarizer 50F and the circular polarizer including the quarter-wave plate 40R and the linear polarizer 50R may be arranged such that the transmission axes of the linear polarizers 40F and 40R are perpendicular to each other as shown in FIG. 4 or may be arranged such that the transmission axes of the linear polarizers 40F and 40R are parallel with each other. Alternatively, the circular polarizers may be arranged such that the transmission axes of the linear polarizers 40F and 40R obliquely intersect each other.

The slow axis of the quarter-wave plate 40F may be perpendicular to or parallel with the slow axis of the quarter-wave plate 40R, or alternatively, may obliquely intersect the slow axis of the quarter-wave plate 40R. Typically, the slow axis of the quarter-wave plate 40F is perpendicular to the slow axis of the quarter-wave plate 40R.

The above-described liquid crystal display employs the structure for displaying an image in the normally black mode. Alternatively, the liquid crystal display may employ the structure for displaying an image in the normally white mode.

Figure 8:
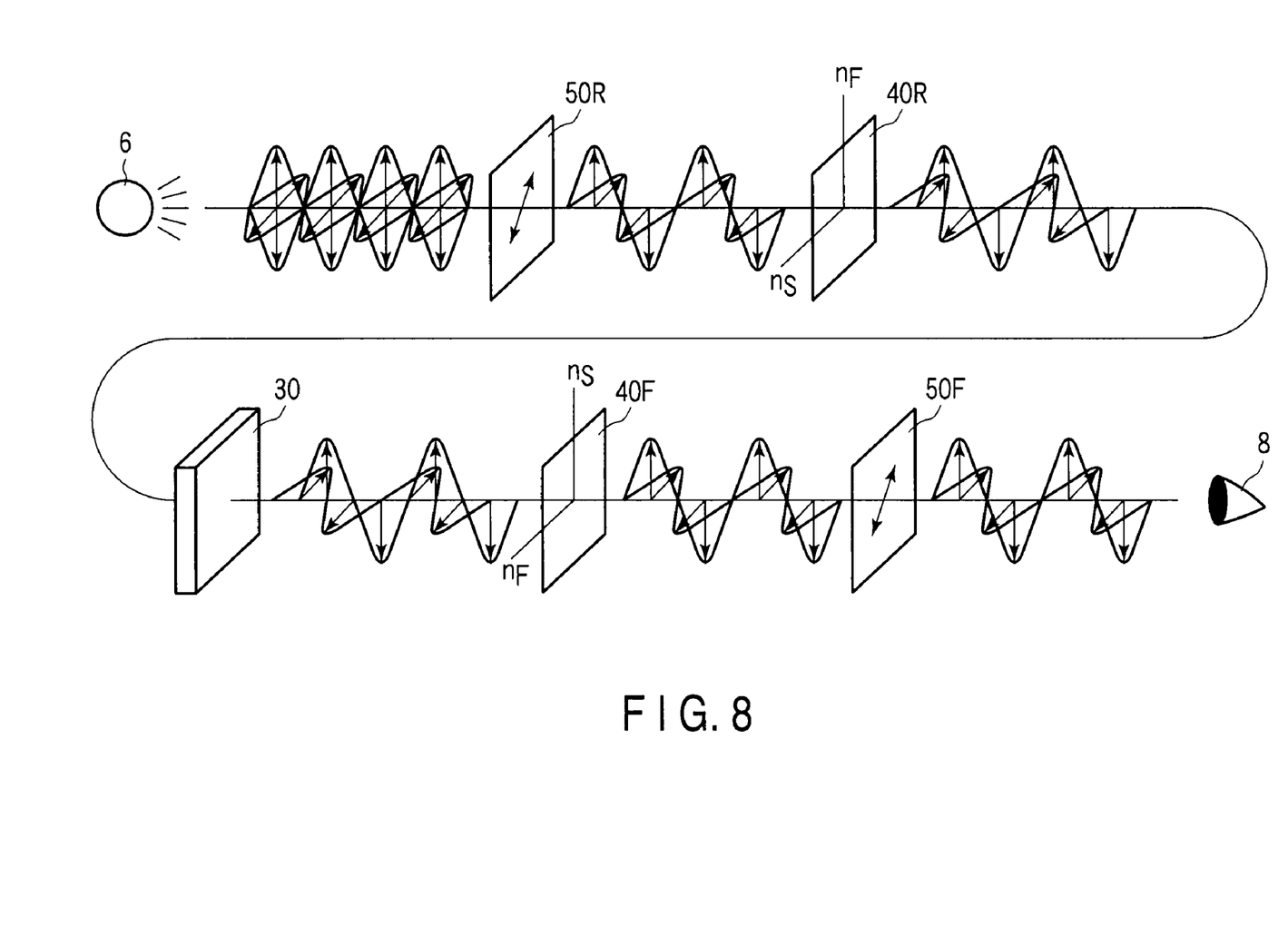
FIG. 8 is a view schematically showing a state of a liquid crystal display according to another modified example when displaying a white image.
Figure 9:
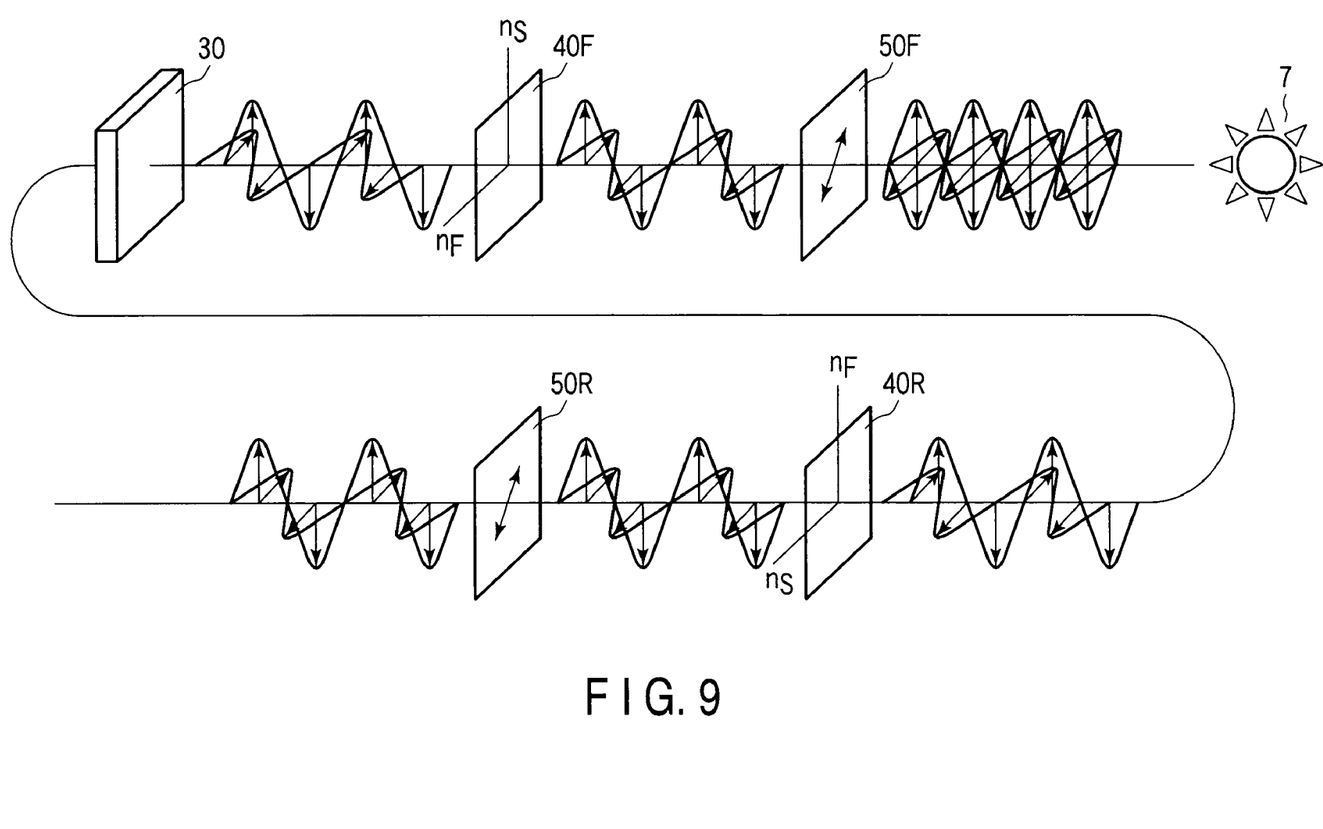
FIG. 9 is a view schematically showing a state of a liquid crystal display employing the structure shown in FIG. 8 when displaying a white image while illuminating its front surface with a natural light.
Figure 10:
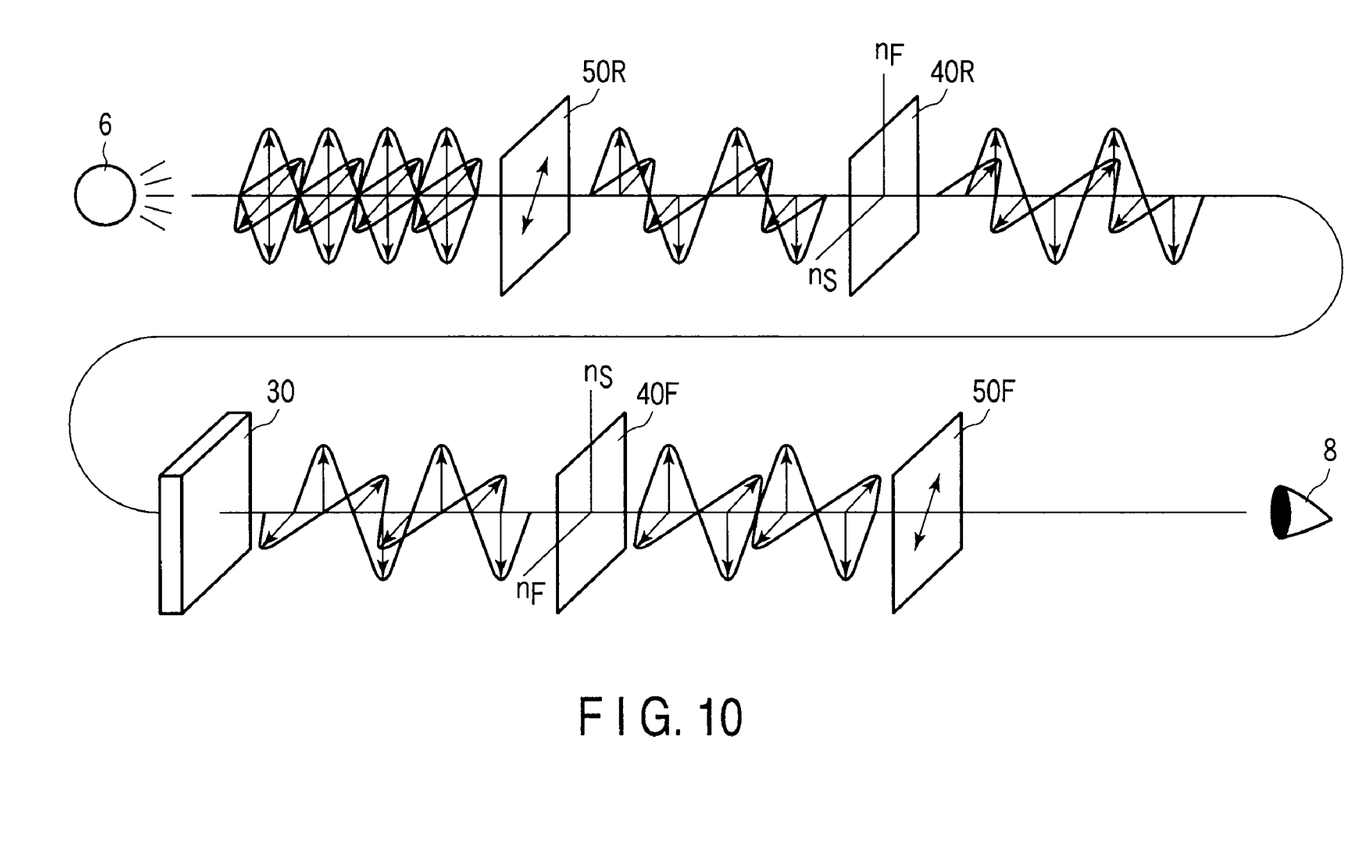
FIG. 10 is a view schematically showing a state of the liquid crystal display employing the structure shown in FIG. 8 when displaying a black image.

FIG. 8 is a view schematically showing a state of a liquid crystal display according to another modified example when displaying a white image. FIG. 9 is a view schematically showing a state of a liquid crystal display employing the structure shown in FIG. 8 when displaying a white image while illuminating its front surface with a natural light. FIG. 10 is a view schematically showing a state of the liquid crystal display employing the structure shown in FIG. 8 when displaying a black image.

When displaying a white image, the liquid crystal display panel 1 employing the structure for displaying an image in the normally white mode transmits portions of light components emitted by the backlight 6 as shown in FIG. 8.

A natural light emitted by the backlight 6, typically a white light enters the linear polarizer 50R. The linear polarizer 50R converts the natural light to a linearly polarized light.

The linearly polarized light enters the quarter-wave plate 40R. The quarter-wave plate 40R converts the linearly polarized light to a right-handed circularly polarized light.

The right-handed circularly polarized light enters the liquid crystal layer 30. When displaying a white image, no voltage is applied or a voltage whose absolute value is almost zero is applied between the electrodes 108a and 108b. Therefore, the liquid crystal layer 30 can selectively reflect a left-handed circularly polarized light component having the specific wavelength $\lambda_{SR}$. The circularly polarized light entering the liquid crystal layer 30, however, is not a left-handed circularly polarized light but a right-handed circularly polarized light. Thus, the liquid crystal layer 30 transmits this right-handed circularly polarized light.

The right-handed circularly polarized light enters the quarter-wave plate 40F. The quarter-wave plate 40F converts the right-handed circularly polarized light to a linearly polarized light.

The linearly polarized light enters the linear polarizer 50F. The electric-field vector of the linearly polarized light has an oscillation plane parallel with the transmission axis of the linear polarizer 50F. Therefore, ideally, the linear polarizer 50 transmits the linearly polarized light without absorbing it.

That is, ideally, all the light components emitted by the backlight 6 and transmitted by the linear polarizer 50R reach the viewer 8. Therefore, the viewer 8 perceives a white image.

It is supposed that the front face of the liquid crystal display displaying a white image is illuminated with a white light as a natural light emitted by the light source 7 such as the sun and luminaire as shown in FIG. 9. The natural light enters the linear polarizer 50F. The linear polarizer 50 converts the natural light to a linearly polarized light.

The linearly polarized light enters the quarter-wave plate 40F. The quarter-wave plate 40F converts the linearly polarized light to a right-handed circularly polarized light.

The right-handed circularly polarized light enters the liquid crystal layer 30. Although the liquid crystal layer 30 selectively reflects the left-handed circularly polarized light having the specific wavelength $\lambda_{SR}$, no right-handed circularly polarized light is selectively reflected by the liquid crystal layer 30. That is, the liquid crystal layer 30 transmits the above-described right-handed circularly polarized light.

The right-handed circularly polarized light enters the quarter-wave plate 40R. The quarter-wave plate 40R converts the right-handed circularly polarized light to a linearly polarized light.

The linearly polarized light enters the linear polarizer 50R. The electric-field vector of the linearly polarized light has an oscillation plane parallel with the transmission axis of the linear polarizer 50R. Therefore, the linear polarizer 50R transmits the linearly polarized light, for example, without absorbing it.

The backlight 6 reflects the linearly polarized light transmitted by the linear polarizer 50R. The liquid crystal panel 1 transmits the reflected linearly polarized light similar to the case described with reference to FIG. 8.

As described above, when the front face of the liquid crystal display is illuminated with a white light as a natural light, no selective reflection occurs and the incident light is reflected by the liquid crystal display to be utilized for displaying an image. Therefore, the liquid crystal display can display a white image of high brightness at high color purity.

When displaying a black image, the liquid crystal display panel 1 blocks the light emitted by the backlight 6 as shown in FIG. 10.

A natural light emitted by the backlight 6, typically a white light enters the linear polarizer 50R. The linear polarizer 50R converts the natural light to a linearly polarized light.

The linearly polarized light enters the quarter-wave plate 40R. The quarter-wave plate 40R converts the linearly polarized light to a right-handed circularly polarized light.

The right-handed circularly polarized light enters the liquid crystal layer 30. When displaying a black image, a voltage whose absolute value is relatively high is applied between the electrodes 108a and 108b. Therefore, the liquid crystal layer 30 does not selectively reflect a left-handed circularly polarized light component having the specific wavelength $\lambda_{SR}$ but serves as a wave plate having a slow axis parallel with the Y-direction. Supposing that the liquid crystal layer 30 serves as a half-wave plate, the liquid crystal layer 30 converts the above-described right-handed circularly polarized light to a left-handed circularly polarized light.

The left-handed circularly polarized light enters the quarter-wave plate 40F. The quarter-wave plate 40F converts the left-handed circularly polarized light to a linearly polarized light.

The linearly polarized light enters the linear polarizer 50F. The electric-field vector of the linearly polarized light has an oscillation plane perpendicular to the transmission axis of the linear polarizer 50F. Therefore, the linearly polarized light is absorbed by the linear polarizer 50F. Thus, the light emitted by the backlight 6 does not reach the viewer 8.

Note that the liquid crystal layer 30 causes no selective reflection when displaying a black image. Therefore, coloring of the black image due to selective reflection cannot occur.

As will be apparent from the above descriptions, the liquid crystal display is less prone to cause the coloring due to selective reflection even when employing the structure for displaying an image in the normally white mode. That is, also in this case, suppressing the coloring due to selective reflection is made possible without increasing the chiral agent content of the liquid crystal material.

Although described here is the case where a black image and a white image are displayed, a gray-scale image can also be displayed. That is, a gray-scale image can be displayed on the display by applying a voltage between the pixel electrode 108a and the counter electrode 108b at a magnitude corresponding to the gray level to be displayed.

The quarter-wave plate 40R may be placed on the surface of the substrate 100 that faces the counter substrate 20. Alternatively, the linear polarizer 50R and the quarter-wave plate 40R may be stacked in this order on the surface of the substrate 100 that faces the counter substrate 20.

Similarly, the quarter-wave plate 40F may be placed on the surface of the substrate 200 that faces the array substrate 10. Alternatively, the linear polarizer 50F and the quarter-wave plate 40F may be stacked in this order on the surface of the substrate 200 that faces the array substrate 10.

The array substrate 10 may be placed between the counter substrate 20 and a viewer. That is, the pixel electrodes 108a and the counter electrodes 108b may be placed between the liquid crystal layer 30 and a viewer.

It is not necessary that the quarter-wave plates 40R and 40F are continuous films. That is, the quarter-wave plates 40R and 40F may be patterned layers. For example, each of the quarter-wave plates 40R and 40F may be provided only at positions that correspond to one of the coloring layers 220R, 220G and 220B having the highest transmittance at the wavelength $\lambda_{SR}$ of the circularly polarized light selectively reflected by the liquid crystal layer 30, and thus may be omitted at other positions.

For example, it is supposed that the wavelength $\lambda_{SR}$ of the circularly polarized light selectively reflected by the liquid crystal layer 30 falls within the wavelength range of blue. Although the blue coloring layer 220B transmits the light having the wavelength $\lambda_{SR}$, it is possible that the light is absorbed by the red coloring layer 220R and the green coloring layer 220G. In this case, in the pixels including the red coloring layer 220R or the green coloring layer 220G, no selective reflection occurs even when the quarter-wave plates 40R and 40F are omitted. Thus, even when each of the quarter-wave plates 40R and 40F is provided only at positions corresponding to the blue coloring layer 220B, the coloring of the display image due to selective reflection can be suppressed.

The above-described technique may be applied to a reflective liquid crystal display or a semi-transparent reflective display instead of a transmissive liquid crystal display. In this case, a reflective layer is placed to face the liquid crystal layer with the linear polarizer 50R and the quarter-wave plate 40R interposed therebetween.

The liquid crystal display employs an active-matrix driving method. Alternatively, the liquid crystal display may employ other driving method such as passive-matrix driving method and segment driving method.

Instead of arranging the pixel electrodes 108a and the counter electrodes 108b on the same substrate, the pixel electrodes 108a and the counter electrodes 108b may be arranged on different substrates. Each pixel PX may further include an electrode in addition to the pixel electrode 108a and the counter electrode.

The amount of light emitted by the backlight may be constant or variable. In the latter case, the amount of visible light emitted by the backlight may be varied in accordance with the brightness of the external environment surrounding the liquid crystal display. To be more specific, it is possible that the amount of visible light emitted by the backlight is made small when the external environment is dark and the amount of visible light emitted by the backlight is made large when the external environment is bright.

Note that in the case where the quarter-wave plates 40F and 40R are omitted, decreasing the amount of visible light emitted by the backlight increases the influence of the light selectively reflected by the liquid crystal layer on the image quality. Thus, the above-described technique is particularly effective to a liquid crystal display in which the amount of visible light emitted by the backlight can be adjusted to a small value.

Examples of the present invention will be described below.

Example 1

In this example, the liquid crystal display described with reference to FIGS. 1 to 3 was manufactured by the following method.

In the manufacture of the array substrate 10, the scanning lines 101a and the auxiliary capacitor lines 101b were first formed on a glass substrate 100. Chromium was used as the material of the scanning lines 101a and the auxiliary capacitor lines.

Then, the scanning lines 101a, the auxiliary capacitor lines and the glass substrate 100 were covered with the insulating film 102 made of silicon oxide. An amorphous silicon film was formed on the insulating film 102 and patterned into the semiconductor layers 103. After that, a channel protection layer (not shown) made of silicon nitride was formed on a part of each semiconductor layer 103, and ohmic layers (not shown) were formed on the semiconductor layers 103 and channel protection layers.

On the insulating film 102, the signal lines 105a, the source electrodes 105b and the power supply lines 105c were formed. In addition, the counter electrodes 108b made of ITO were formed on the insulating film 102 to partially cover the power supply lines 105c. Here, in order to form the counter electrodes 108a, a layer is patterned utilizing photolithography technique.

Thereafter, on the signal lines 105a, the source electrodes 105b, the power supply lines 105c and the counter electrodes 108b, the insulating film 109 made of silicon nitride was deposited. In the insulating film 109, contact holes are formed at positions corresponding to the source electrodes 105b.

Then, on the insulating film 109, the pixel electrodes 108a made of ITO were formed to fill the contact holes, respectively. In order to form the pixel electrodes 108a, an ITO layer as a continuous layer was deposited on the insulating film 109 and patterned utilizing photolithography technique. Note that the distance between the pixel electrode 108a and the counter electrode 108b was set at 5 µm.

In the manufacture of the counter substrate 20, a chromium film was first formed on a glass substrate 200 and patterned, thereby obtaining a black matrix. Subsequently, the striped color filter 220 was formed thereon using photosensitive acrylic resins in which red, green, and blue pigments were added.

Then, columnar spacers (not shown) having a height of 5 µm and bottom surface dimensions of 5 µm×10 µm were formed on the color filter 220 using photolithography. These columnar spacers were so formed as to be positioned above the signal lines 105a when the array substrate 10 and counter substrate 20 were bonded together.

After washing the surfaces of the array substrate 10 and the counter substrate 20, the major surface of the counter substrate 20 was coated in a frame pattern with an epoxy adhesive as the material of a sealing layer by using a dispenser. Note that the frame formed by the adhesive layer was provided with an opening to be used as an injection port later. Subsequently, the array substrate 10 and the counter substrate 20 were aligned such that the pixel electrodes 108a and the color filter 220 faced each other. After this alignment, the array substrate 10 and the counter substrate 20 were bonded together and heated to 160° C. under pressure, thereby curing the adhesive.

Subsequently, the empty cell thus obtained was loaded into a vacuum chamber, and evacuated. After that, a liquid crystal material was injected into the cell from the injection port. As the liquid crystal material, used was a composition containing a nematic liquid crystal JC1041 manufactured by Chisso, a nematic liquid crystal 5CB manufactured by Aldrich, and a chiral agent ZLI-4572 manufactured by Merck at 48.2 mol %, 47.4 mol % and 4.4 mol %, respectively.

Then, the injection port was sealed with an epoxy adhesive. Thus, a liquid crystal cell was obtained. Note that the cell gap of the liquid crystal cell was about 5 µm.

Then, the quarter-wave plate 40R and the linearly polarizing plate 50R were laminated in this order on the outer surface of the array substrate 10. In addition, on the outer surface of the counter substrate 20, the quarter-wave plate 40F and the linearly polarizing plate 50F were laminated in this order. To be more specific, the quarter-wave plate 40R was bonded to the array substrate 10 such that its slow axis was parallel with the X-direction. On the other hand, the quarter-wave plate 40F was bonded to the counter substrate 20 such that its slow axis was parallel with the Y-direction. The linearly polarizing plates 50R and 50F were bonded to the quarter-wave plates 40R and 40F, respectively, such that each transmission axis formed an angle of 45° with the X-direction or the Y-direction and the transmission axes intersected each other. Thus, the left-handed circular polarizer including the quarter-wave plate 40R and the linear polarizer 50R and the right-handed circular polarizer including the quarter-wave plate 40F and the linear polarizer 50F were obtained.

Thereafter, the driving circuits 2 to 4, etc. were connected to the array substrate 10, and the driving circuits 2 to 4 were connected to the controller 5. Further, the display panel 1 thus obtained and a backlight were assembled into a display. In this way, a liquid crystal display was completed.

The liquid crystal display was driven and its performance was evaluated. To be more specific, a response speed was determined while changing the voltage applied between the pixel electrode 108a and the counter electrode 108b of each pixel PX at a frequency of 30 times per second. The applied voltage was changed among three values of −15V, 0V and +15V. Then, a contrast ratio was obtained from the brightness when the applied voltage was set at −15V, the brightness when the applied voltage was set at 0V, and the brightness when the applied voltage was set at +15V. As a result, a response speed of 1 millisecond and a contrast ratio of 1000:1 were achieved.

Example 2

In this example, the structure described with reference to FIG. 7 was employed in the counter electrodes 108b instead of employing the structure described with reference to FIGS. 1 to 3 in the counter electrodes 108b. A liquid crystal display was manufactured by the same method as that described in Example 1 except for the above.

Then, the display was driven by the same method as that described in Example 1 and its performance was evaluated. As a result, a response speed of 1 millisecond and a contrast ratio of 1000:1 were achieved.

Example 3

In this example, employed was a design in which the circular polarizer including the quarter-wave plate 40F and the linearly polarizing plate 50F was a left-handed circular polarizer and the circular polarizer including the quarter-wave plate 40R and the linearly polarizing plate 50R was a right-handed circular polarizer. To be more specific, the directions of the transmission axes of the linearly polarizing plates 50F and 50R were rotated by 90° with respect to the directions of the transmission axes of the linearly polarizing plates 50F and 50R in the liquid crystal display manufactured in Example 1. A liquid crystal display was manufactured by the same method as that described in Example 1 except for the above.

Then, the display was driven by the same method as that described in Example 1 and its performance was evaluated. As a result, its contrast ratio was 100:1. In addition, the screen was seen bluish when displaying a black image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display comprising:
a liquid crystal layer causing a selective reflection and exhibiting Kerr effect;
first and second electrodes applying voltage to the liquid crystal layer;
a first circular polarizer disposed between the liquid crystal layer and a viewer and allowing a first circularly polarized light incident on the liquid crystal layer when irradiated with a natural light, the first circularly polarized light having an electric-field vector rotating in a direction reverse to a rotation direction of an electric-field vector of a circularly polarized light selectively reflected by the liquid crystal layer; and
a second circular polarizer facing the first circular polarizer with the liquid crystal layer interposed therebetween and allowing a second circularly polarized light incident on the liquid crystal layer when irradiated with a natural light.

2. The display according to claim 1, wherein the second circularly polarized light has an electric-field vector rotating in a direction reverse to the rotating direction of the electric-field vector of the circularly polarized light selectively reflected by the liquid crystal layer.

3. The display according to claim 1, wherein the second circularly polarized light has an electric-field vector rotating in the same direction as the rotating direction of the electric-field vector of the circularly polarized light selectively reflected by the liquid crystal layer.

4. The display according to claim 1, wherein both the first and second electrode are interposed between the liquid crystal layer and the first circular polarizer or between the liquid crystal layer and the second circular polarizer.

5. The display according to claim 1, wherein the first electrode includes comb-tooth portions each extending in a first direction parallel with a main surface of the liquid crystal layer and arranged in a second direction parallel with the main surface and crossing the first direction, and the second electrode faces the main surface at an opening between the comb-tooth portions or through the opening.

6. The display according to claim 1, wherein the liquid crystal layer causes the selective reflection when no voltage is applied between the first and second electrodes and exhibits different refractive indices in two directions perpendicular to a thickness direction of the liquid crystal layer and crossing each other when voltage is applied between the first and second electrodes.

7. The display according to claim 1, wherein a selective reflection wavelength of the liquid crystal layer is longer than 400 nm and shorter than 800 nm.

8. The display according to claim 1, further comprising a backlight illuminating the liquid crystal layer through the second circular polarizer.

9. A liquid crystal display comprising:
a liquid crystal layer causing a selective reflection and exhibiting Kerr effect;
first and second electrodes applying voltage to the liquid crystal layer;
a first circular polarizer facing the liquid crystal layer and allowing a first circularly polarized light incident on the liquid crystal layer when irradiated with a natural light, the first circularly polarized light having an electric-field vector rotating in a direction reverse to a rotation direction of an electric-field vector of a circularly polarized light selectively reflected by the liquid crystal layer;
a second circular polarizer facing the first circular polarizer with the liquid crystal layer interposed therebetween and allowing a second circularly polarized light incident on the liquid crystal layer when irradiated with a natural light; and
a backlight illuminating the liquid crystal layer through the second circular polarizer.

10. The display according to claim 9, wherein the second circularly polarized light has an electric-field vector rotating in a direction reverse to the rotating direction of the electric-field vector of the circularly polarized light selectively reflected by the liquid crystal layer.

11. The display according to claim 9, wherein the second circularly polarized light has an electric-field vector rotating in the same direction as the rotating direction of the electric-field vector of the circularly polarized light selectively reflected by the liquid crystal layer.

12. The display according to claim 9, wherein both the first and second electrode are interposed between the liquid crystal layer and the first circular polarizer or between the liquid crystal layer and the second circular polarizer.

13. The display according to claim 9, wherein the first electrode includes comb-tooth portions each extending in a first direction parallel with a main surface of the liquid crystal layer and arranged in a second direction parallel with the main surface and crossing the first direction, and the second electrode faces the main surface at an opening between the comb-tooth portions or through the opening.

14. The display according to claim 9, wherein the liquid crystal layer causes the selective reflection when no voltage is applied between the first and second electrodes and exhibits different refractive indices in two directions perpendicular to a direction parallel with a thickness of the liquid crystal layer and crossing each other when voltage is applied between the first and second electrodes.

15. The display according to claim 9, wherein a selective reflection wavelength of the liquid crystal layer is longer than 400 nm and shorter than 800 nm.

16. A liquid crystal display comprising:
a liquid crystal layer causing a selective reflection;
a first electrode including comb-tooth portions each extending in a first direction parallel with a main surface of the liquid crystal layer and arranged in a second direction parallel with the main surface and crossing the first direction;
a second electrode facing the main surface at an opening between the comb-tooth portions or through the opening;
a first circular polarizer facing the liquid crystal layer and allowing a first circularly polarized light incident on the liquid crystal layer when irradiated with a natural light, the first circularly polarized light having an electric-field vector rotating in a direction reverse to a rotation direction of an electric-field vector of a circularly polarized light selectively reflected by the liquid crystal layer;
a second circular polarizer facing the first circular polarizer with the liquid crystal layer interposed therebetween and allowing a second circularly polarized light incident on the liquid crystal layer when irradiated with a natural light; and
a backlight illuminating the liquid crystal layer through the second circular polarizer.

17. The display according to claim 16, wherein the second circularly polarized light has an electric-field vector rotating in a direction reverse to the rotating direction of the electric-field vector of the circularly polarized light selectively reflected by the liquid crystal layer.

18. The display according to claim 16, wherein the second circularly polarized light has an electric-field vector rotating in the same direction as the rotating direction of the electric-field vector of the circularly polarized light selectively reflected by the liquid crystal layer.

19. The display according to claim 16, wherein the liquid crystal layer causes the selective reflection when no voltage is applied between the first and second electrodes and exhibits different refractive indices in two directions perpendicular to a direction parallel with a thickness of the liquid crystal layer and crossing each other when voltage is applied between the first and second electrodes.

20. The display according to claim 16, wherein a selective reflection wavelength of the liquid crystal layer is longer than 400 nm and shorter than 800 nm.

* * * * *